US012635056B2

(12) United States Patent
Schulz et al.

(10) Patent No.: US 12,635,056 B2
(45) Date of Patent: May 19, 2026

(54) LIGHTING ARRANGEMENT

(71) Applicant: Karl Leibinger Asset Management GmbH & Co. KG, Muehlheim / Donau (DE)

(72) Inventors: Harald Schulz, Tuttlingen (DE); Sven Zehnder, Aichhalden (DE)

(73) Assignee: KARL LEIBINGER ASSET MANAGEMENT GMBH & CO. KG, Mühlheim an der Donau (DE)

( * ) Notice: Subject to any disclaimer, the term of this patent is extended or adjusted under 35 U.S.C. 154(b) by 925 days.

(21) Appl. No.: 17/811,497

(22) Filed: Jul. 8, 2022

(65) Prior Publication Data

US 2023/0009128 A1    Jan. 12, 2023

(30) Foreign Application Priority Data

Jul. 9, 2021    (DE) ..................... 10 2021 117 734.0

(51) Int. Cl.
| | |
|---|---|
| *H05B 47/11* | (2020.01) |
| *G01J 3/50* | (2006.01) |
| *H05B 45/22* | (2020.01) |
| *H05B 45/32* | (2020.01) |
| *H05B 47/17* | (2020.01) |

(52) U.S. Cl.
CPC ............... *H05B 47/11* (2020.01); *G01J 3/50* (2013.01); *H05B 45/22* (2020.01); *H05B 45/32* (2020.01); *H05B 47/17* (2020.01)

(58) Field of Classification Search
CPC .. A61B 90/30; A61B 1/000095; G02B 21/06; G02B 21/365; H05B 47/11; H05B 45/22; G01J 3/50
See application file for complete search history.

(56) References Cited

U.S. PATENT DOCUMENTS

| | | | |
|---|---|---|---|
| 5,347,431 | A | 9/1994 | Blackwell et al. |
| 2005/0099824 | A1 | 5/2005 | Dowling et al. |
| 2006/0251408 | A1 | 11/2006 | Konno et al. |
| 2014/0049633 | A1* | 2/2014 | Pretorius ................ G02B 21/22 |
| | | | 348/79 |
| 2015/0078615 | A1 | 3/2015 | Staples, II et al. |
| 2016/0007839 | A1 | 1/2016 | Yoshida |
| 2017/0064258 | A1 | 3/2017 | Westwick et al. |
| 2020/0289223 | A1* | 9/2020 | Denlinger .............. A61B 34/77 |

FOREIGN PATENT DOCUMENTS

| | | | |
|---|---|---|---|
| DE | 102009025662 | A1 | 12/2010 |
| DE | 102012220672 | A1 | 5/2014 |
| WO | 2007104165 | A1 | 9/2007 |
| WO | 2009002467 | A2 | 12/2008 |
| WO | 2015185662 | A2 | 12/2015 |
| WO | 2017127929 | A1 | 8/2017 |

* cited by examiner

*Primary Examiner* — William J Carter
(74) *Attorney, Agent, or Firm* — McCoy Russell LLP

(57)    ABSTRACT

The present disclosure relates to a lighting arrangement, which comprises at least one light source, with at least one camera and a control system, wherein the colour and/or colour temperature of the light source is variable and the camera records images of a region illuminated by the light source. According to the disclosure, the control system controls the lighting arrangement such that the light source illuminates the illuminated region successively with light of a different colour and/or colour temperature, wherein the control system separately evaluates and/or outputs a first image recorded in a first colour and/or colour temperature of the lighting.

20 Claims, 1 Drawing Sheet

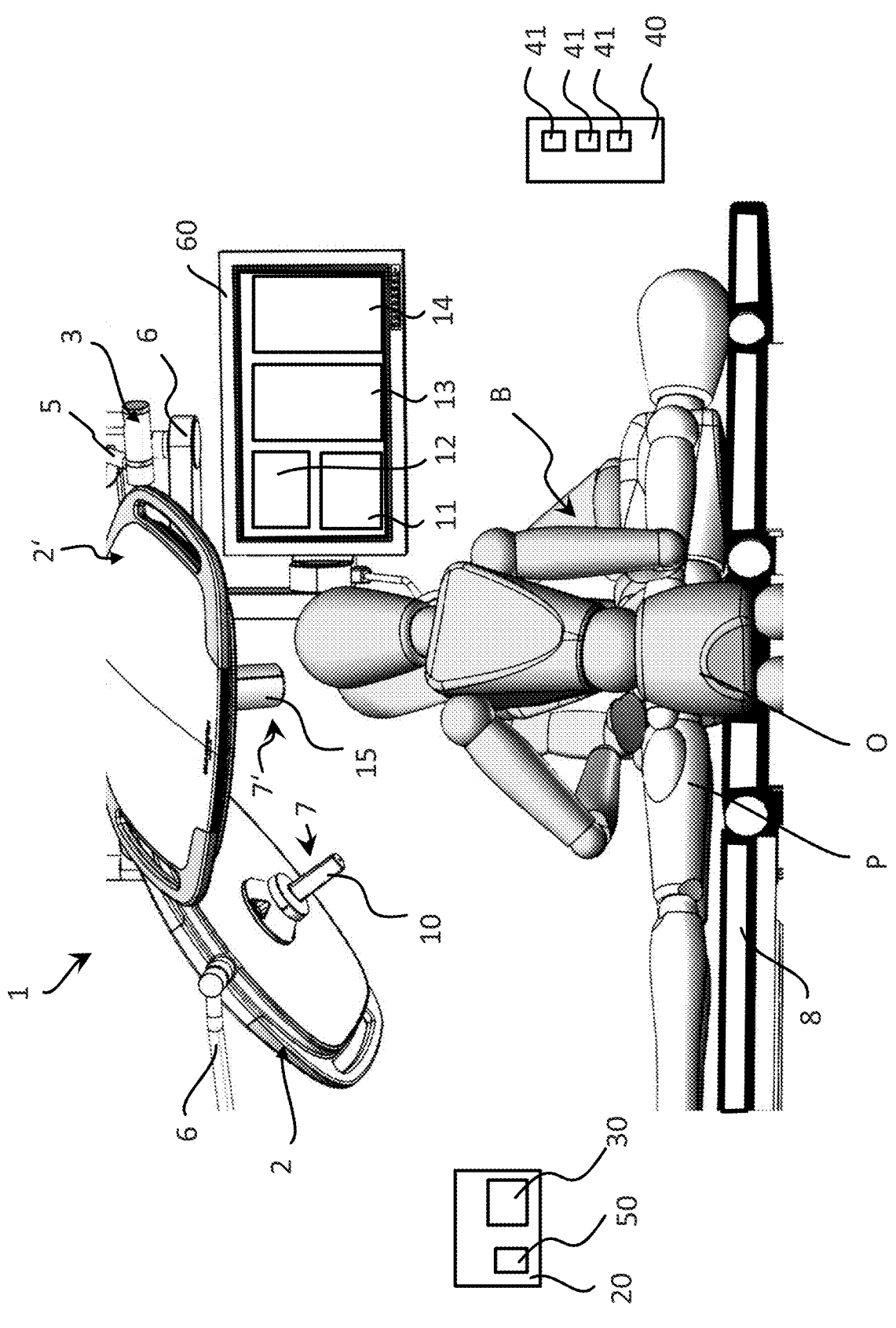

LIGHTING ARRANGEMENT

CROSS-REFERENCE TO RELATED APPLICATION

The present application claims priority to German Patent Application No. 10 2021 117 734.0 filed on Jul. 9, 2021. The entire contents of the above-listed application is hereby incorporated by reference for all purposes.

TECHNICAL FIELD

The present disclosure relates to a lighting arrangement, which comprises at least one light source, with at least one camera and a control system.

BACKGROUND

It is known that when illuminating a region, the colour and/or colour temperature of the lighting has a decisive influence on the visibility of different structures located in the region.

SUMMARY

In the operating environment or medical environment, it is presently possible, particularly in the case of surgical lamps, to set the colour and/or colour temperature. Depending on the tissue illuminated, differences and contours in the tissue can thus be rendered visible with varying clarity under different colours and/or colour temperatures. For example, the difference between tumorous tissue and healthy tissue can be seen better at a first colour temperature, but the difference between muscle tissue and nerve tissue is more clearly visible at a second colour temperature. Various colours and/or colour temperatures can be set manually for this purpose, wherein the effect of the respective colour and/or colour temperature is assessed by an operator and then the operating region is illuminated by a desired colour and/or colour temperature. This inevitably always involves a compromise. Furthermore, a camera is frequently used in the operating environment or medical environment, which records an image of the operating region. The operating region can thus be presented in enlarged form, for example, and/or the operating region can be made accessible to a person who has no direct insight into the region. The latter is the case in particular with regard to an endoscopy camera.

The reference just made to an operating environment is purely by way of example and serves to illustrate the problem that is presented. The possibility of changing the colour and/or colour temperature of lighting and the improvement in the visibility of structures associated with this can likewise be employed in other technical fields. This is preferably used when good visibility of different structures in an illuminated region takes a particularly high priority.

The method of setting the colour and/or colour temperature mentioned at the beginning has disadvantages, however. It is necessary first of all for an operator to carry out changing of the colour and/or colour temperature of the lighting manually, which is time-consuming. Furthermore, on a camera image, for example, which was recorded during illumination with a specific colour and/or colour temperature, only the advantageous visibility of the structural differences achieved by the specific colour and/or colour temperature can be realised, while regions of the structure that would be clearly visible in another colour and/or colour temperature are unfavourably illuminated in this regard.

The object of the present disclosure is therefore to provide a lighting arrangement with improved properties.

The present disclosure comprises a lighting arrangement that comprises at least one light source, with at least one camera and a control system, wherein the colour and/or colour temperature of the light source is variable and the camera records images of a region illuminated by the light source. The control system controls the lighting arrangement in such a way that the light source illuminates the illuminated region successively with light of a different colour and/or colour temperature, wherein the control system evaluates and/or outputs separately at least a first image recorded in a first colour and/or colour temperature of the lighting. The optical effect of the first colour and/or colour temperature of the lighting can thus be assessed by means of the first image and/or used without setting the colour and/or colour temperature of the lighting arrangement permanently to the first colour and/or colour temperature.

As described above, the present disclosure therefore comprises initially a first variant in which the light source radiates white light, the colour temperature of which is variable. In a second variant, the light source radiates coloured light, on the other hand, wherein the colour of the coloured light is variable. If reference is made below to the colour temperature, therefore, this is the colour temperature of the white light radiated according to the first variant.

In a preferred configuration, the camera records colour images of the illuminated region.

In a possible configuration of the present disclosure, the control system controls the light source in at least one operating mode in such a way that the change in colour and/or colour temperature takes place so quickly that this is not perceptible for the human eye when looking directly at the illuminated region. Such a change can thus take place, for example, even during ongoing surgery without a surgeon being disturbed by this change in light conditions when looking directly at the illuminated region.

The operating mode just mentioned can preferably be switched on and/or switched off by means of a manually operable input device.

In a possible configuration of the present disclosure, a main lighting colour and/or colour temperature, with which the light source illuminates the region and which is perceptible for the human eye, can be set manually.

The main lighting colour and/or colour temperature can preferably be set by means of a manually operable input device.

In a possible configuration of the present disclosure, it is possible to set the first colour and/or colour temperature of the lighting, in which an image is recorded that is evaluated and/or output separately.

The first lighting colour and/or colour temperature can preferably be set by means of a manually operable input device.

In a possible configuration of the present disclosure, the light source is controlled in one operating mode in such a way that the light source illuminates the region with a main lighting colour and/or colour temperature and switches from this main lighting colour and/or colour temperature for a period of time to the first colour and/or colour temperature, wherein during this period of time at least one image is recorded, which is evaluated and/or output separately.

In a possible configuration of the present disclosure, the period of time is preferably so short that in direct observation of the illuminated region, a perceived colour and/or colour temperature does not change due to the switch.

In a possible configuration of the present disclosure, the period of time is less than 200 ms, preferably less than 50 ms long.

In a possible configuration of the present disclosure, the light source is an LED light source, wherein the LEDs of the LED light source are operated in a pulsed manner by means of the control system.

In a possible configuration of the present disclosure, the control system controls the lighting arrangement in at least one operating mode in such a way that during the recording of the image the colour and/or colour temperature of the pulses does not change.

This is not absolutely necessary, however. On the contrary, it is important that the averaged colour and/or colour temperature during the exposure time of the separately evaluated and/or output image differs compared with a preceding and/or following period.

In a possible configuration of the present disclosure, the control system controls the lighting arrangement in at least one operating mode in such a way that pulses occurring during the recording of an image produce on average a desired colour and/or colour temperature.

In a possible configuration of the present disclosure, the control system controls the lighting arrangement in at least one operating mode in such a way that the illumination takes place successively with a plurality of different colours and/or colour temperatures, wherein the control system separately evaluates and/or outputs several images recorded in respectively different colours and/or colour temperatures of the lighting.

The illumination preferably takes place with one of the plurality of different colours and/or colour temperatures in each case in a period of time that is less than 200 ms, preferably less than 50 ms long.

The control system preferably returns to a main lighting colour and/or colour temperature before illumination takes place again with another colour and/or colour temperature.

In a possible configuration of the present disclosure, the control system controls the lighting arrangement in at least one operating mode in such a way that a switch is made from a main lighting colour and/or colour temperature to one of the different colours and/or colour temperatures and back again.

In a possible configuration of the present disclosure, an image is presented on a display of the lighting arrangement in one operating mode, which image shows the illuminated region in a colour and/or colour temperature of the lighting other than the colour and/or colour temperature of the light source that is perceptible during the presentation of the image when looking directly at the illuminated region.

An operator, for example a surgeon, has the option hereby of looking at the illuminated region on a display in a colour and/or colour temperature other than that which he perceives directly when looking at the illuminated region. Structures that are not perceptible or are only poorly perceptible during direct observation due to the unfavourable colour and/or colour temperature can be checked hereby on the display.

In a possible configuration of the present disclosure, it is possible to set the other colour and/or colour temperature of the lighting in which the image presented on the display was recorded.

In a possible configuration of the present disclosure, several images showing the illuminated region in a respectively different colour and/or colour temperature of the lighting are presented on the display in one operating mode.

For example, an image can be displayed with a colour and/or colour temperature other than the main colour and/or colour temperature as an image-in-image.

In a possible configuration of the present disclosure, in one operating mode at least one image is presented on the display that shows the illuminated region in lighting with a changing colour and/or colour temperature.

In a possible configuration of the present disclosure, the lighting arrangement is controlled such that in the case of a change in colour and/or colour temperature of the lighting of an image presented on the display, a colour and/or colour temperature of the lighting perceived when looking directly at the illuminated region does not change and/or at least another image presented on the display reproduces the region with illumination of which the colour and/or colour temperature does not change.

In a possible configuration of the present disclosure, it is possible to set a desired main lighting colour and/or colour temperature with which the light source illuminates the region in normal operation, in particular it can be set by an operator on the basis of images that can be presented on a monitor with a respectively different colour and/or colour temperature of the lighting and/or on the basis of an image presented on the display with a changing colour and/or colour temperature of the lighting.

In a possible configuration of the present disclosure, it is possible to set a first colour and/or colour temperature in which an image is recorded, which image is evaluated and/or output separately, in particular by means of an image presented on the display with a changing colour and/or colour temperature of the lighting, in particular by means of a colour scan presented on the display.

In a possible configuration of the present disclosure, an evaluation of the images recorded takes place in at least one operating mode by means of the control system such that information from at least two images recorded in lighting of a different colour and/or colour temperature is integrated into a resulting image.

In a possible configuration of the present disclosure, the resulting image is presented on a display in at least one operating mode.

In a possible configuration of the present disclosure, the evaluation of the images takes place by means of structure detection in at least one operating mode.

An evaluation preferably takes place of at least two images recorded in illuminations of a different colour and/or colour temperature of the illuminated region such that by means of the structure detection, information from at least two images recorded in illuminations of a different colour and/or colour temperature is integrated into a resulting image.

In particular, the two or more images recorded in a different colour and/or colour temperature can first be individually evaluated in this way and structures recognisable in the respective colour and/or colour temperature of the image can be extracted from the image and presented in combination in the resulting image.

In a possible configuration of the present disclosure, evaluation takes place of at least three images of the illuminated region recorded in illuminations of a different colour and/or colour temperature.

In these configurations, a separate evaluation therefore takes place of the images recorded in a different colour and/or colour temperature, wherein the result of the evaluation is presented in a common resulting image.

In some of the configurations described above, on the other hand, an image that was recorded in another colour and/or colour temperature of the lighting was output, in particular displayed, separately.

In a possible configuration of the present disclosure, the separately output and/or evaluated image is continuously updated.

In a possible configuration of the present disclosure, the separately output and/or evaluated image is updated at points in time predetermined by the control system.

In a possible configuration of the present disclosure, the separately output and/or evaluated image is produced and/or updated on the basis of a signal produced by a manual input of an operator.

These three variants for creation and/or updating are available similarly also for the creation and/or presentation of a resulting image produced from images recorded in several different colours and/or colour temperatures of the lighting.

The lighting arrangement can preferably comprise an input device with a foot switch, wherein the separately output and/or evaluated image is created and/or updated on the basis of a signal produced by actuation of the foot switch.

In a possible configuration of the present disclosure, at least one camera is a 2D camera for recording a 2D image of the illuminated region.

In a possible configuration of the present disclosure, at least one camera is a 3D camera for recording a 3D image of the illuminated area. In particular, the 3D camera can comprise two individual cameras, which permit a stereo view of the illuminated region.

In a possible configuration of the present disclosure, at least one camera operates in at least one of the VIS spectrum, IR spectrum and/or UV spectrum.

The at least one camera preferably operates in the VIS spectrum, i.e. in a spectrum of visible light.

In a possible configuration of the present disclosure, the lighting arrangement is a luminaire arrangement.

In a possible configuration of the present disclosure, the at least one light source is a luminaire, in particular a surgical lamp.

The surgical lamp can comprise a light source body with a handle arranged centrally and/or laterally by which the position and/or orientation of the surgical lamp is variable.

The surgical lamp can be arranged on a carrier system, in particular on a carrier system mounted on the ceiling. In particular, the carrier system can comprise a central shaft on which one or more support arms are arranged pivotably about a vertical axis, wherein the surgical lamp and/or surgical lamps are each arranged on a support arm.

In a possible configuration of the present disclosure, the at least one light source is an endoscopy light source.

In a possible configuration of the present disclosure, the lighting arrangement has at least one operating mode in which images recorded by means of an endoscopy camera of a region illuminated by the endoscopy light source can be presented on a display by means of the control system.

In particular, the lighting arrangement according to the disclosure can therefore be used in endoscopic interventions to illuminate the region treated endoscopically.

In one possible configuration the lighting arrangement therefore comprises, apart from the light source, a light conductor via which the light of the light source is conducted to the operating site. Furthermore, the lighting arrangement preferably comprises a light conductor via which an image of the operating site is conducted to the camera. Separate light conductors for the light source and the camera or a common light conductor can be used in this case.

The light conductor or conductors preferably run through an endoscopic instrument, via which they can be introduced into the body of the patient.

The display of an endoscopic lighting arrangement aids the surgeon in observing the operating site. This can be a monitor, data glasses, 3D glasses and/or VR glasses or another suitable display. In one possible configuration, the display enables a 3D view of the operating site for the surgeon. This can be achieved, for example, by the use of two cameras and/or two displays.

In a possible configuration of the present disclosure, individual images of the endoscopy camera recorded respectively in a different colour and/or colour temperature can be integrated into one another by means of the control system into one resulting image.

The resulting image is preferably a 2D resulting image or a 3D resulting image.

The present disclosure further comprises a method for operating a lighting arrangement. The lighting arrangement in this case comprises at least one light source, at least one camera and a control system. According to the disclosure, the method comprises changing the colour and/or colour temperature of the light source and recording images of a region illuminated by the light source by means of the camera. The method further comprises controlling the lighting arrangement by means of the control system so that the light source illuminates the illuminated region successively with light of a different colour and/or colour temperature, and separate evaluation and/or outputting, in particular presentation, of at least a first image recorded in a first colour and/or colour temperature of the lighting.

The method preferably takes place as already described above in respect of the inventive lighting arrangement and/or as described below on the basis of the FIGURE and the exemplary embodiments.

The present disclosure further comprises software with commands for executing a method as just presented.

The present disclosure further comprises software for integrating information from at least two images recorded in a different colour and/or colour temperature into a resulting image.

The software is preferably configured as already described above with regard to the inventive lighting arrangement and/or with regard to the method and/or as will be described below on the basis of the FIGURE and the exemplary embodiments.

In a possible configuration of the present disclosure, the control system of the lighting arrangement comprises a microcontroller and a non-volatile memory, wherein stored in the non-volatile memory is a program with commands, which program, when it runs on the microcontroller, executes a method described above or below and/or brings about operation as described above or below of the light source arrangement. In particular, the microcontroller controls the light source and/or the display and/or receives images from the camera in this case. The microcontroller can be the processor of a computer.

The display used according to the configurations of the present disclosure described above preferably comprises a flat display element, which displays two-dimensional images.

In a possible configuration of the present disclosure, the display is a monitor. This can be arranged in a suitable position in or outside of the operating theatre, for example.

In a possible configuration of the present disclosure, the display is data glasses, 3D glasses or VR glasses.

Use of the present disclosure is not confined to the field of luminaires or surgical lamps. On the contrary, the lighting arrangement according to the disclosure can also be used in materials inspection and/or materials testing.

If illumination is spoken of in the context of the present disclosure, this is not restricted to the spectrum of visible light. On the contrary, the present disclosure can be used with electromagnetic radiation in any spectral range.

If illumination of a different colour and/or colour temperature is spoken of in the context of the present disclosure, this quite generally means radiation with a different spectrum.

The light source therefore constitutes a radiation source that can be controlled such that it can emit radiation with a different spectrum.

For this the radiation source can comprise, for example, even two or more radiation elements, which emit radiation of a spectrum different from one another, and which can be controlled separately.

If a camera is spoken of in the context of the present disclosure, this means any sensor arrangement that can detect corresponding radiation two-dimensionally and/or spatially. The camera preferably comprises, however, a two-dimensional sensor chip and/or optics through which an image is reproduced on the sensor chip. The sensor chip preferably comprises several colour channels so that the camera can record colour images.

In particular, the camera can be a video camera.

In a possible configuration of the present disclosure, a terahertz camera is used.

The present disclosure is now explained in greater detail by means of a drawing and exemplary embodiments.

BRIEF DESCRIPTION OF THE FIGURES

Here the FIGURE shows:

FIG. 1 an exemplary embodiment of the lighting arrangement with two light sources, wherein a camera is arranged on at least one of the light sources.

DETAILED DESCRIPTION

FIG. 1 shows an exemplary embodiment of an inventive lighting arrangement 1 with a first light source 2 and a second light source 2'. In the scope of the present disclosure, however, the lighting arrangement 1 could also comprise just one light source 2 or more than two light sources 2.

As already mentioned above, the present disclosure can be used in different technical fields. The reference to an operating environment or medical environment is purely by way of example.

In the exemplary embodiment, the light sources 2 and 2' are each a surgical lamp, wherein the light sources 2 and 2' each generate a light field by means of which the region B is illuminated. The region B in the present exemplary embodiment is an operating region B.

The light sources 2 and 2' can each be oriented and/or positioned such that the operating region B of a patient P lying on a table 8 is illuminated as desired. In other cases the light fields of the two light sources 2 and 2' can also be oriented onto different regions. This is conceivable, for example, in the case of a transplant, wherein one surgical lamp 2 can be directed onto the operating region B, while one surgical lamp 2' can be directed onto the organ to be transplanted.

If several light sources 2 and 2' are provided as in the exemplary embodiment, the region B can be illuminated by means of one of the light sources 2 or 2' or by means of both light sources 2 and 2', wherein the control system 20 controls the light sources 2 and 2' accordingly.

A carrier system 3 is provided in the exemplary embodiment on which the light sources 2 and 2' are arranged above the illuminated region B. Adjustment of the light sources 2 and 2' can take place manually. Furthermore, adjustment can be realised by one or more drives of the carrier system 3.

In the exemplary embodiment the carrier system 3 comprises a ceiling bracket on which a central shaft can be arranged. Support arms can be arranged in turn on the central shaft pivotably about a vertical axis formed by the central shaft. The light sources 2 and 2' can each be arranged via further support arm elements, spring bows and/or cardanic suspension with one or more articulations 5, 6 on different support arms. Configurations of the carrier system 3 other than that just described are likewise conceivable.

In the exemplary embodiment the lighting arrangement 1 comprises at least one camera 10 and/or 15. In the scope of the present disclosure the lighting arrangement 1 can comprise just one camera 10, 15, two cameras 10, 15 or more than two cameras.

In the exemplary embodiment the camera 10, 15 is arranged respectively on a light source 2, 2' and is integrated in particular into a handle 7, 7' of a camera 10, 15. The handle 7, 7' is preferably arranged centrally on a light source body of the light source 2, 2'.

In particular, the camera 10, 15 has an optical main axis, which runs parallel to the optical main axis of the light source on which it is arranged, wherein the optical main axis of the camera preferably coincides with the optical main axis of the light source.

It is also conceivable to provide one or more cameras 10 and 15 on the carrier system 3.

Furthermore, a monitor 60 for displaying an image 11 recorded by means of the camera 10, 15 is provided in the exemplary embodiment, wherein the monitor 60 can be arranged on the carrier system 3 via a support arm element as depicted. In the exemplary embodiment the monitor 60 is located in the operating theatre. It is also conceivable, however, for the monitor 60 to be provided in a room separate from the operating theatre. The image 11 of the camera 10, 15 can thus be made available for training purposes, for example. It is also conceivable for an image from a camera to be supplied to a memory unit for documentation purposes.

The term "image" in the sense of the present disclosure comprises both a video image in the sense of a sequence of images and a single image in the sense of a photo and/or an individual image from a sequence of images in the sense of a frame of a video image sequence.

In a possible configuration of the present disclosure, the image is a video image and/or a frame of a video image sequence.

In the exemplary embodiment a manually operable input device 40 is also provided, by means of which a main lighting colour and/or colour temperature perceptible for the human eye can be set manually. As depicted, the input device 40 can have several input elements 41, by means of which a desired main lighting colour and/or colour temperature and/or an operating mode of the lighting arrangement 1 can be selected. The input elements 41 can exist in the form of switches, controls and/or a touchscreen, for example. For example, a first input element 41 can be provided for setting one or more operating modes of the lighting arrangement 1, a second input element 41 for setting a main lighting colour and/or main lighting colour temperature of the lighting and/or a third input element for setting another colour and/or colour temperature of the lighting in which an image is separately evaluated and/or output.

The lighting arrangement 1 comprises a control system 20, as shown in FIG. 1. The control system 20 can be networked in a wired and/or wireless manner with at least one of the light sources 2 and 2' and/or with the input device 40. It is also conceivable that the light sources 2 and 2' are networked with one another in a wired and/or wireless manner. Furthermore, the control system can be integrated into one of the light sources and/or the input device.

In a first aspect of the present disclosure, the control system 20 controls the light sources such that these illuminate the illuminated region B successively with light of a different colour and/or colour temperature, wherein the control system 20 separately evaluates and/or outputs at least a first image 11 recorded in a first colour and/or colour temperature of the lighting.

A possible operation of the lighting arrangement 1 depicted in FIG. 1 is now explained by means of an example:

The light source 2 and/or light source 2' illuminates the region in a first embodiment with white light with an adjustable main lighting colour temperature, for example of 4000 K. This main lighting colour temperature can be set manually by means of the input device 40. Alternatively the light source 2, 2' can illuminate the region with coloured light, wherein a main colour of the lighting can be set, for example blue light with a wavelength range of between 380 and 500 nanometres, for example.

Operation of the camera 10 or 15 for recording images 11 to 14 of the illuminated region can take place at a predetermined frequency, for example of 50 Hz, so that the camera records an image of the illuminated region B for 20 ms in each case, for example.

The lighting arrangement 1 has an operating mode in which the control system 20 controls the lighting arrangement 1 in such a way that the light source 2, 2' illuminates the illuminated region B successively with light of a different colour temperature, for example at values of 3000 K, 3500 K, 4000 K, 5000 K, 5500 K.

In a possible configuration of the present disclosure, a respective illumination duration with the corresponding colour temperature value can be a fixed value, for example 32 ms.

In a preferred embodiment the lighting switches from a main lighting colour temperature to one of the colour temperatures and back before being switched to the next colour temperature.

The lighting arrangement and/or camera 10 or 15 can now be controlled so that at least one image 11 is recorded during each of the illuminations with one of the different colour temperature values.

Thus several images taken at a respectively different colour temperature can be recorded and/or at least one image recorded at a colour temperature other than the main lighting colour temperature.

The image or images of different colour temperature can then be displayed on the monitor 60. If several images recorded with illumination at a different colour temperature are displayed, this can take place successively and/or simultaneously, for example as an image-in-image.

Alternatively or in addition, evaluation of the images can take place such that information from at least two of the images 11 recorded at a different colour temperature is evaluated by the control system 20 and combined in a resulting image 14. In the resulting image 14, structural differences of the illuminated region that would otherwise be clearly visible only on separate images can thus be rendered clearly visible. In particular, structures can be detected in the individual images by the control system and combined in a resulting image.

The resulting image 14 can be presented, for example, on the monitor 60 shown in FIG. 1, so that this can be made available to the surgeon O during the operation.

The control system 20 can have at least one operating mode in which it controls the lighting arrangement 1 such that illumination of the region with the different colour temperature values takes place so quickly in succession that this cannot be perceived by the human eye when looking directly at the illuminated region on account of the slowness of the human eye.

Control therefore takes place in the exemplary embodiment such that a main lighting colour temperature perceived by the surgeon O when looking directly at region B does not change even during changing of the colour temperature of the lighting according to the disclosure.

Due to the separate evaluation and/or outputting of images that were taken at the colour temperatures not perceptible by the eye, additional information can be made available to the surgeon, in particular in the form of one or more images with another colour temperature.

Alternatively or in addition to the change in the colour temperature of the lighting described previously, a change in the colour of the lighting can take place with an otherwise unchanged procedure.

Other possible configurations of the present disclosure, in particular possible operating modes of the lighting arrangement 1, are described below.

In a first operating mode, the light source 2 illuminates the region B with a main lighting colour and/or colour temperature, wherein an image 11 of the illuminated region B recorded in a first colour and/or colour temperature is presented on the monitor 60. The first colour and/or colour temperature of the image 11 differs from the main lighting colour and/or colour temperature. This makes it possible for different structures to be able to be rendered clearly visible when looking at the image 11 and looking directly at the illuminated region B. In particular, the control system switches the colour and/or colour temperature of the lighting from the main lighting colour and/or colour temperature briefly to the first colour and/or colour temperature, wherein an image recorded in this period is presented on the monitor 60.

In a second operating mode, another image 12 of the camera 10 is presented on the monitor 60, wherein the image 12 was recorded in a second colour and/or colour temperature of the lighting. The second colour and/or colour temperature differs from the first colour and/or colour temperature of the image 11. By means of these displayed images 11 and 12 of respectively different colour and/or colour temperature, respectively different structures can be rendered clearly visible to the surgeon O. It is conceivable, for example, that on image 11 the difference between tumorous tissue and healthy tissue is clearly visible, while on image 12 the difference between muscle tissue and nerve tissue is clearly visible. In particular, the control system switches the colour and/or colour temperature of the lighting for this from the main lighting colour and/or colour temperature briefly in each case to the first colour and/or colour temperature and to the second colour and/or colour temperature, wherein images recorded in the respective periods are presented on the monitor 60.

In a third operating mode, an image 13 of the illuminated region B is presented on the monitor 60, which image shows the illuminated region B in lighting that is changing in its colour and/or colour temperature. This enables the surgeon O to determine a suitable colour and/or colour temperature relatively quickly. Based on this determination the main lighting colour and/or colour temperature could be changed.

Furthermore, it can also be possible to set the first and/or second colour and/or colour temperature.

In a fourth operating mode, a resulting image is displayed on the monitor that comprises information from at least two images, which were recorded in illuminations of a different colour and/or colour temperature.

The control system 20 preferably comprises structure detection 30 for this, wherein the structure detection 30 can be integrated into the control system 20. It is also conceivable that the structure detection 30 is provided separately to the control system 20.

In a possible configuration of the present disclosure, the structure detection is structure recognition software.

The structure detection 30 serves to detect structures in recorded images. The structures detected in the images recorded in a different colour and/or colour temperature of the lighting are preferably presented combined in a resulting image.

For example, in a first image 11 recorded in a first colour and/or colour temperature, a clearly visible contrast difference between healthy tissue and tumorous tissue can be identified by means of the structure detection 30, wherein in a second image 11 recorded in a second colour and/or colour temperature, a clearly visible contrast difference between nerve tissue and muscle tissue can be identified by means of the structure detection 30. Based on information from the first and the second image, the control system 20 can accordingly produce a resulting image by means of the structure detection 30 in which both the clearly visible difference between tumorous tissue and healthy tissue due to illumination with the first colour and/or colour temperature and the clearly visible difference between nerve tissue and muscle tissue due to illumination with the second colour and/or colour temperature are visible.

In a possible configuration of the present disclosure, a computing unit 50 can be provided by means of which integration can take place of information from at least two images recorded in illuminations of a different colour and/or colour temperature into a resulting image, wherein the structure detection 30 is preferably used for this integration.

The computing unit 50 can be integrated together with the structure detection 30 into the control system 20. It is also conceivable that the computing unit 50 is provided separately to the control system 20. The computing unit 50 can be networked in a wired and/or wireless manner with the control system 20 and/or the structure detection 30.

In a possible configuration of the present disclosure, the lighting arrangement comprises at least two operating modes. The control system is preferably implemented such that an operator can select at least one operating mode and/or several operating modes. In particular, several of the first to fourth operating modes described above can be available, wherein an operator can select one or more of these. This selection preferably takes place by means of a manually actuatable input device 40. The lighting arrangement 1 can operate simultaneously in several operating modes.

Updating of the image displayed can take place continuously and/or at predetermined intervals. In particular, a switch to at least one other colour and/or colour temperature and/or a colour or colour temperature scan can be carried out for this continuously and/or at predetermined intervals.

Alternatively or in addition, updating of the image displayed can be triggered by an operator, in particular by actuation of an input device.

In the exemplary embodiment depicted in FIG. 1, the lighting arrangement is a surgical lamp arrangement. The present disclosure is not limited hereto, however, and can also be used in the case of any other light sources, in particular in all lighting applications in surgery.

In a possible configuration of the present disclosure, the at least one light source is an endoscopy light source and/or the at least one camera is an endoscopy camera. The present disclosure can be used here in the same way as described above with regard to the exemplary embodiment described in FIG. 1.

Information from images recorded by means of the endoscopy camera in a respectively different colour and/or colour temperature of the lighting can be integrated into a resulting image 14 here by means of the control system 20. The resulting image 14 can be presented on the monitor 60, wherein the resulting image 14 is preferably updated continuously and/or at times predetermined by the control system.

If the present disclosure is used in the field of endoscopy, no further consideration has to be given to the direct optical impression of the lighting, as the surgeon O only sees the video image in any case. In this case a stronger change in the colour and/or colour temperature of the lighting can preferably be made or longer phases selected for the individual colours and/or colour temperatures when changing the lighting, for example compared with use of the present disclosure in a surgical lamp. In the field of endoscopy it is important, however, that the images are reproduced without delay on the one hand and that a smooth image presentation takes place on the other hand.

Regardless of the configuration otherwise of the lighting arrangement, the camera can initially be a 2D camera.

The present disclosure can also be used, however, when the camera is a 3D camera. In this case the images described above are 3D images. The output in this case can take place via a monitor with 3D presentation and/or 3D glasses.

A 3D camera can comprise two single cameras, which interact in the form of a stereo camera.

It would also be conceivable to use information from an image 11 of a first camera 10 of a first surgical lamp with information from an image of a second camera 15 of a second surgical lamp to create a 3D image. This can take place by means of a computing unit 50, for example.

In a preferred exemplary embodiment, the light source 2 is an LED light source 2. In the exemplary embodiment, the LEDs of the LED light source 2 are operated in a pulsed manner by means of the control system. In such pulsed operation, the LEDs are either switched off or switched on for the duration of a pulse, wherein the colour and/or colour temperature as well as the brightness of the light source 2 are controlled over the duration of the individual pulses in which the LEDs are switched on. For example, the pulsed operation can take place at a frequency of 300 Hz.

In particular, the LED light source 2 comprises at least two different types of LED for generating light of a different colour and/or colour temperature. Through the length of the pulses with which the respective LEDs are operated the control system can set the colour and/or colour temperature.

In a first embodiment, the LED light source 2 comprises two types of LEDs, which produce white light with a different colour temperature, for example a first type of LED with a colour temperature of 2700 K or 3000 K and a second type of LED with a colour temperature of 5000 K or 5500

K, wherein the control system sets the colour temperature to a desired value by controlling the ratio of the quantity of light radiated by the two types of LED.

In a second embodiment, the LED light source 2 comprises two types of LEDs, which produce light of a different colour, for example a first type of LED, which radiates red light, and a second type of LED, which radiates blue light, wherein the control system sets the colour and/or colour temperature to a desired value by controlling the ratio of the quantity of light radiated by the two types of LED. The pulsed activation of the LED enables the colour and/or colour temperature of the lighting to be changed very quickly. In particular, the colour and/or colour temperature can be controlled individually for each pulse.

The present disclosure utilises this fast controllability of the LEDs in order, in operation of the LEDs with a main lighting colour and/or colour temperature, to intersperse one or more pulses of another colour and/or colour temperature, which is not recognisable for an observer due to the slowness of the human eye.

By suitable selection and/or evaluation of the images recorded by the camera, however, at least one image recorded at a colour and/or colour temperature other than that of the main lighting can be separately evaluated and/or displayed.

The camera is preferably a video camera, which records the illuminated region at a certain frame rate, for example at 60 Hz, i.e. 60 images per second.

If the lighting by the LEDs takes place with different colours and/or colour temperatures, therefore, the images or frames of the camera will each show an image in a different colour and/or colour temperature of the lighting. According to the disclosure the images recorded at a different colour and/or colour temperature are now separately evaluated and/or output or displayed. The lighting can therefore be dissolved into the individual different colours and/or colour temperatures by the camera, while the human eye does not perceive this on account of its greater slowness.

In one possible configuration, synchronisation takes place between the activation of the LEDs and recording by the camera and/or evaluation of the images of the camera. The control system therefore knows the periods of time in which illumination took place with another colour and/or colour temperature and evaluates the images recorded during this period separately. Furthermore, such synchronisation can also serve to ensure that the colour and/or colour temperature of the pulses of the activated LED does not change during the recording of an image 11. It can thus be ensured that an image of the illuminated region is recorded in a desired colour and/or colour temperature of the lighting, and that different colours and/or colour temperatures of the lighting are not mixed in an image.

Alternatively or in addition, the control system 20 can control the lighting arrangement 1 such that the pulses of the activated LEDs that occur in a time period in which an image is recorded yield the desired colour and/or colour temperature on average.

Such synchronisation can also be dispensed with, however.

In a possible configuration of the present disclosure, the control system evaluates the colour and/or colour temperature of the images recorded by the camera and recognises by means of the evaluation the colour and/or colour temperature in which the images were recorded in each case. Images that were recorded in a certain colour temperature and/or colour are then separately evaluated and/or output.

Illumination preferably takes place in this case with one colour and/or colour temperature such that it is ensured by the duration of the respective illumination that at least one image is recorded in which illumination took place with a desired colour and/or colour temperature at least for more than 50% of the recording time going into the image and/or a desired mean colour and/or colour temperature can be achieved for this recording time.

If the illumination is carried out, for example, with another colour and/or colour temperature respectively for a period equal to double the duration of a frame, it is always ensured that at least one frame is exposed with the desired colour and/or colour temperature.

FIG. 1 shows example configurations with relative positioning of the various components, with the surgeon shown standing vertically with respect to gravity. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in FIG. 1, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of FIG. 1 and used to describe positioning of elements of FIG. 1 relative to one another. As such, elements shown above other elements are positioned vertically above the other elements, in one example. As yet another example, shapes of the elements depicted within the FIGURES may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE CHARACTER LIST

1 Lighting arrangement
2, 2' Light source 15                                                    16

3 Carrier system
5 Support arm
6 Support arm element
7 Handle
8 Operating table
10 Camera
11 Image (recorded in a first colour and/or colour temperature)
12 Image (recorded in a second colour and/or colour temperature)
13 Image (image changing in colour and/or colour temperature)
14 Resulting image
15 Camera
20 Control system
30 Structure detection
40 Input device
41 Input elements
501 Computing unit
60 Monitor
B Region
O Surgeon
P Patient

The invention claimed is:

1. A lighting arrangement, which comprises at least one light source, with at least one camera and a control system, wherein the color and/or color temperature of the light source is variable and the camera records images of a region illuminated by the light source, wherein the control system controls the lighting arrangement such that the light source illuminates the illuminated region successively with light of a different color and/or color temperature, wherein the control system separately evaluates and/or outputs at least a first image recorded in a first color and/or color temperature of the lighting, wherein the light source is controlled in one operating mode such that the light source illuminates the region with a main lighting color and/or color temperature and switches from this main lighting color and/or color temperature for a period of time to the first color and/or color temperature, and wherein during this period of time at least one image is recorded in a color and/or color temperature other than the main lighting color and/or color temperature, including in the first color and/or color temperature, and the at least one image is evaluated and displayed separately.

2. The lighting arrangement according to claim 1, wherein the control system controls the light source in at least one operating mode in such a way that the change in the color and/or color temperature takes place so quickly that this is not perceptible for the human eye when looking directly at the illuminated region.

3. The lighting arrangement according to claim 2, wherein a main lighting color and/or color temperature, which is perceptible for the human eye and with which the light source illuminates the region, can be set manually.

4. The lighting arrangement according to claim 1, wherein the light source is an LED light source, wherein the LEDs of the LED light source are operated in a pulsed manner by means of the control system.

5. The lighting arrangement according to claim 4, wherein the control system controls the lighting arrangement in at least one operating mode such that during the recording of the image, the color and/or color temperature of the pulses does not change and/or that the pulses occurring during the recording of an image yield a desired color and/or color temperature on average.

6. The lighting arrangement according to claim 1, wherein the control system controls the lighting arrangement in at least one operating mode such that illumination takes place successively with a plurality of different colors and/or color temperatures, wherein the control system separately evaluates and/or outputs several images recorded in respectively different and/or color temperatures of the lighting.

7. The lighting arrangement according to claim 6, wherein a switch takes place in each case from a main lighting color and/or color temperature to one of the different colors and/or color temperatures and back again.

8. The lighting arrangement according to claim 1, wherein in one operating mode, an image is presented on a display of the lighting arrangement, which image shows the illuminated region in a color and/or color temperature of the lighting other than the color and/or color temperature of the light source, which is perceptible during the presentation of the image when looking directly at the illuminated region.

9. The lighting arrangement according to claim 1, wherein in one operating mode, several images are presented on a display of the lighting arrangement, which images show the illuminated region in a respectively different color and/or color temperature of the lighting, and/or wherein in one operating mode at least one image is presented on the display, which image shows the illuminated region in illumination that is changing in its color and/or color temperature.

10. The lighting arrangement according to claim 9, wherein the lighting arrangement is controlled such that in the event of a change in a color and/or a color temperature of the lighting of an image presented on the display, a color and/or color temperature of the lighting perceived when looking directly at the illuminated region does not change and/or at least another image presented on the display reproduces the region with illumination of which the color and/or color temperature does not change.

11. The lighting arrangement according to claim 1, wherein a desired main lighting color and/or color temperature with which the light source illuminates the region in normal operation can be set by an operator on the basis of images displayable on a display with a respectively different color and/or color temperature of the lighting.

12. The lighting arrangement according to claim 11, wherein the separately output and/or evaluated image is updated continuously and/or is updated at points in time predetermined by the control system and/or is produced and/or updated on the basis of a signal produced by a manual input of an operator.

13. The lighting arrangement according to claim 1, wherein an evaluation of recorded images in at least one operating mode takes place by means of the control system such that information from at least two of the images recorded in illuminations of a different color and/or color temperature are integrated into a resulting image.

14. The lighting arrangement according to claim 13, wherein the resulting image is presented on a display and/or wherein the evaluation of the images is carried out by means of structure detection.

15. The lighting arrangement according to claim 1, wherein the at least one camera is a 2D camera for recording a 2D image of the illuminated region, and/or wherein the at least one camera is a 3D camera for recording a 3D image of the illuminated region.

16. The lighting arrangement according to claim 1, wherein the at least one light source is at least one surgical lamp or at least one endoscopy light source.

17. The lighting arrangement according to claim 16, wherein the lighting arrangement has at least one operating mode, in which images recorded by means of an endoscopy camera of a region illuminated by means of the endoscopy light source can be presented on a display by means of the control system, wherein individual images of the endoscopy camera recorded in a respectively different color and/or color temperature can be integrated into one another by means of the control system in a resulting image.

18. The lighting arrangement according to claim 1, wherein the period of time is so short that on direct observation of the illuminated region, a perceived color and/or color temperature does not change due to the switch and is less than 200 ms.

19. A method for operating a lighting arrangement, wherein the lighting arrangement comprises at least one light source, at least one camera and a control system, wherein the method comprises changing the color and/or color temperature of the light source and comprises the recording of images of a region illuminated by the light source by means of the camera, wherein the method comprises the following steps:

control of the lighting arrangement by means of the control system so that the light source illuminates the illuminated region successively with light of a different color and/or color temperature, including a main lighting color and/or color temperature and a first color and/or color temperature; and separate evaluation and/or outputting of at least a first image recorded in a first color and/or color temperature of the lighting, wherein the first image is recorded in a color and/or color temperature other than the main lighting color and/or color temperature.

20. A software with commands for executing a method according to claim 19 and/or a software of the lighting arrangement of claim 14 with commands for integrating information from at least two images recorded in illuminations of a different color and/or color temperature into a resulting image.

* * * * *